(Model.)
C. A. FINLEY.
NUT LOCK.
No. 367,203. Patented July 26, 1887.
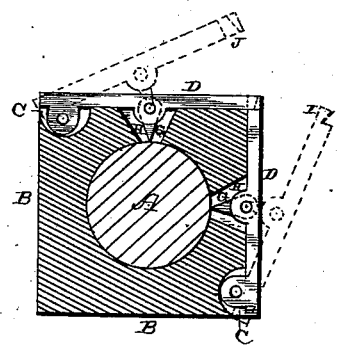
Witnesses.
L. H. Gardner
Edm. P. Ellis
Inventor.
C. A. Finley,
per J. A. Lehmann,
atty.

UNITED STATES PATENT OFFICE.

CHARLES A. FINLEY, OF HOLTON, KANSAS.

NUT-LOCK.

SPECIFICATION forming part of Letters Patent No. 367,203, dated July 26, 1887.

Application filed May 31, 1887. Serial No. 239,870. (Model.)

*To all whom it may concern:*

Be it known that I, CHARLES A. FINLEY, of Holton, in the county of Jackson and State of Kansas, have invented a certain new and useful Improvement in Nut-Locks; and I do hereby declare the following to be a full, clear, and exact description of the invention, such as will enable others skilled in the art to which it pertains to make and use it, reference being had to the accompanying drawing, which forms part of this specification.

My invention relates to an improvement in nut-locks; and it consists in the combination of the screw-threaded bolt, the nut having grooves in two of its adjoining edges, the pivoted levers which are placed in the grooves, and the pivoted points which are attached to the inner sides of the levers, and which pass through openings in the sides of the nuts, so as to bite against the screw-threaded surface of the bolt, as will be more fully described hereinafter.

The object of my invention is to provide a nut-lock in which the nut is locked in position by two levers provided with sharp pivoted points which are forced through openings in the guides, so as to bite against the sides of the bolt, and thus prevent the nut from becoming loose upon the bolt.

The accompanying drawing represents a horizontal section taken through the nut.

A represents an ordinary screw-threaded bolt, and B the nut. In two adjoining edges of this nut are made the grooves C, and pivoted at diagonally-opposite corners of the nut in these grooves are the arms or levers D, which have their ends so shaped as to be adapted to be locked together, as shown. Pivoted to the inner side of each of these arms or levers is a steel point or projection, G, which, when the arms are closed into the grooves, passes through the openings H in the nut and bite into the thread of the bolt for the purpose of locking the nut in position.

After the nut has been screwed upon the bolt into the desired position, that arm or lever having the tenon I formed upon its free end is forced in any suitable manner into the groove in the side of the nut, and then the other arm or lever having the opening J through its end is forced inward in a like manner. The tenon catches in the opening of the other lever, and thus the two parts are locked in position. In forcing the levers in the grooves the sharp points I are made to bite into the thread of the bolt, and thus lock the nut so securely in position that it cannot possibly work loose.

Having thus described my invention, I claim—

1. The combination of the screw-threaded bolt, the nut having grooves in two of its sides, the pivoted arms or levers, and the pivoted points connected to the inner sides of the levers and which are made to pass through openings in the side of the nut, substantially as shown.

2. The combination of the screw-threaded bolt, the nut having grooves formed in two of its edges, the arms or levers pivoted in these grooves and adapted to be locked together at their free ends, and the pivoted points I, which pass through openings in the nut and lock it securely in position upon the bolt, substantially as set forth.

In testimony whereof I affix my signature in presence of two witnesses.

CHARLES A. FINLEY.

Witnesses:
M. F. WHITE,
CYRUS F. HURREE.